United States Patent
Koester

(10) Patent No.: US 6,361,100 B1
(45) Date of Patent: Mar. 26, 2002

(54) TARP RETRACTION SYSTEM

(76) Inventor: Leon Koester, P.O. Box 156, Boonville, IN (US) 47601

( * ) Notice: Subject to any disclaimer, the term of this patent is extended or adjusted under 35 U.S.C. 154(b) by 0 days.

(21) Appl. No.: 09/535,339

(22) Filed: Mar. 24, 2000

Related U.S. Application Data

(60) Provisional application No. 60/126,071, filed on Mar. 25, 1999.

(51) Int. Cl.$^7$ .................................................. B60P 7/02
(52) U.S. Cl. ................................... 296/100.18; 296/118
(58) Field of Search ....................... 296/100.17, 100.18, 296/100.12, 98, 118, 100.01, 101, 104, 105; 52/63, 23

(56) References Cited

U.S. PATENT DOCUMENTS

| | | | | |
|---|---|---|---|---|
| 3,066,974 A | * | 12/1962 | Ambli | 296/100.17 |
| 4,335,915 A | * | 6/1982 | Knapp | 296/98 |
| 4,823,707 A | * | 4/1989 | Salsbury et al. | 296/100.18 X |
| 4,915,439 A | * | 4/1990 | Cramaro | 296/98 |
| 5,211,441 A | * | 5/1993 | Barkus et al. | 296/104 |
| 5,487,584 A | * | 1/1996 | Jespersen | 296/100.18 |
| 5,664,824 A | * | 9/1997 | Stephens et al. | 296/100.17 |
| 5,722,712 A | | 3/1998 | Pollen | 135/132 |
| 5,769,482 A | | 6/1998 | Kirk | 296/100.18 |
| 5,873,210 A | * | 2/1999 | Brumleve | 296/100.17 X |
| RE36,748 E | * | 6/2000 | Stephens et al. | 296/100.17 |

FOREIGN PATENT DOCUMENTS

| CA | 1237748 | * | 6/1988 | 296/98 |
|---|---|---|---|---|
| DE | 217574 | * | 10/1908 | 296/105 |

* cited by examiner

Primary Examiner—Joseph D. Pape
Assistant Examiner—Patricia Engle
(74) Attorney, Agent, or Firm—Woodard, Emhardt, Naughton, Moriarity & McNett

(57) ABSTRACT

An apparatus for removing open bed truck tarp support bows from their position over a truck bed. The apparatus includes a control bar positioned along the upper edge of one side of a truck bed, with a multiplicity of truck tarp bows extending radially from the bar. A lever for rotating the control bar is also attached to the bar. When the control bar is rotated outward, the bows rotate upward and away from the open truck bed providing uninhibited access to the truck bed for loading and unloading. When the control bar is rotated inward, the bows are lowered to extend across the truck bed to support the truck tarp thereon.

18 Claims, 7 Drawing Sheets

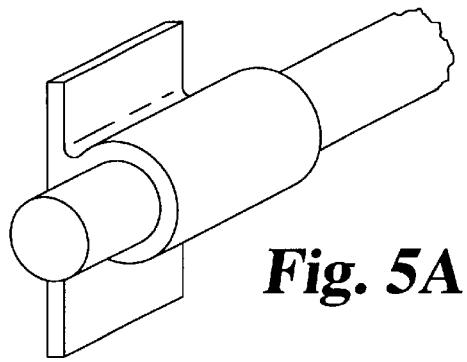
*Fig. 5A*
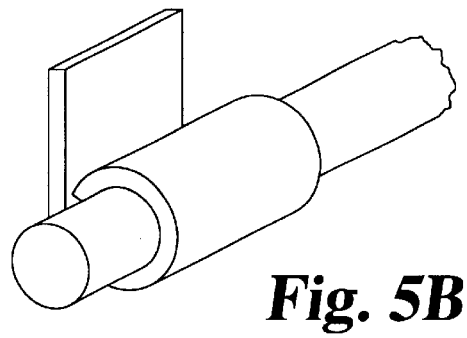
*Fig. 5B*
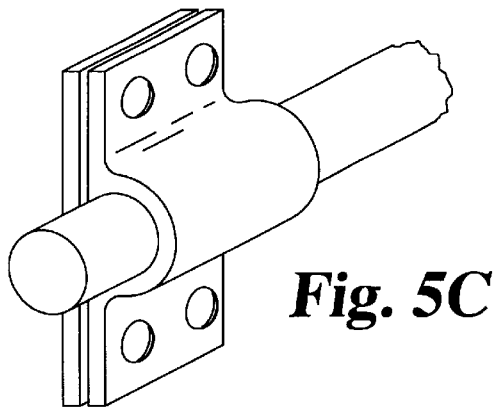
*Fig. 5C*
*Fig. 5D*
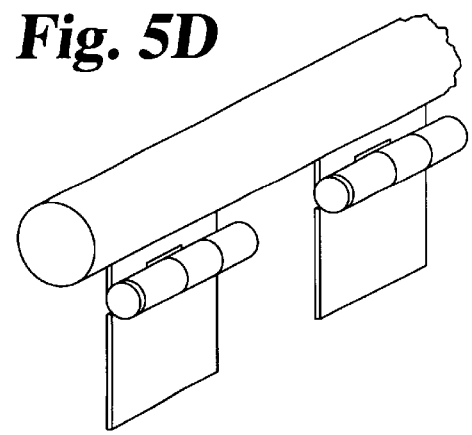

TARP RETRACTION SYSTEM

This appln claims benefit of Prov. No. 60/126,071, filed Mar. 25, 1999.

FIELD OF THE INVENTION

The present invention relates generally to open bed trucks that use a tarp to cover the load, and more particularly to an apparatus for removing and replacing the bows used to support such tarps. The invention allows a driver to quickly and safely move the tarp and supporting bows between open and closed positions to facilitate loading and unloading an open bed truck.

BACKGROUND

Open bed trucks are used for hauling bulk material due to the ease of loading and unloading material. Such truck beds are frequently covered with tarps to prevent load material from blowing out of the bed during transit, and to prevent exposure of the load to weather conditions.

Typically, these tarps are supported over the bed by a multiplicity of bow elements placed across the width of the truck bed. The ends of the bows are usually held by brackets along the upper edge of the sides of the bed, with the bows extending up and across the truck bead to allow ample room for a load that may be higher in some places than the side walls. For a typical 16 to 40 foot load bed, four to ten tarp bows are normally used.

It is known to use a "roll-up" system to remove the tarp from the truck, to allow material to be loaded or unloaded. These roll-up systems use a rod running the length of the tarp, and a handle to facilitate rolling the rod over the support bows. As the tarp rod is rolled over the bows, the tarp is rolled around the rod and off of the truck.

Removal of the support bows has not been so easy. Presently, removal of the bows requires an operator to mount the truck bed and manually disengage the bow ends from their brackets and remove each bow. This manual moving of tarp bows is a tedious and sometimes dangerous maneuver. An operator can easily fall into the load material or off the side of the truck, resulting in injury to the operator and/or to the load material. This is particularly true when the load in the bed is slippery (as, for example, with scrap sheet metal), or when the truck and its load are icy or wet.

A need therefore exists for an apparatus and system of operation that easily, quickly, and safely removes the support bows after a truck tarp has been rolled away from the truck. The present invention addresses that need.

SUMMARY OF THE INVENTION

Briefly describing one aspect of the present invention, there is provided an apparatus and method for removing truck tarp support bows from their position over a truck bed. In one preferred embodiment the apparatus comprises a control bar positioned along the upper edge of one side of a truck bed, with a multiplicity of truck tarp bows extending radially from the bar. A lever for rotating the control bar is also attached to the bar. When the control bar is rotated outward, the bows rotate upward and away from the open truck bed providing uninhibited access to the truck bed for loading and unloading. When the control bar is rotated inward, the bows are lowered to extend across the truck bed to support the truck tarp thereon.

In another embodiment, a bracket for supporting the tarp after it has been rolled off of the bows is attached to the control bar. In this embodiment, the weight of the tarp can advantageously be used to assist in rotating the control bar outward, and in holding the bows in their "open" position.

One object of the present invention is to provide an apparatus for allowing an operator to easily and safely remove truck tarp bows from their normal position above the truck bed.

Further objects and advantages will be apparent from the following description.

BRIEF DESCRIPTION OF THE FIGURES

FIGS. 5(a–d) show examples of alternative control bar attachments.

DESCRIPTION OF THE PREFERRED EMBODIMENTS

Figure 1:
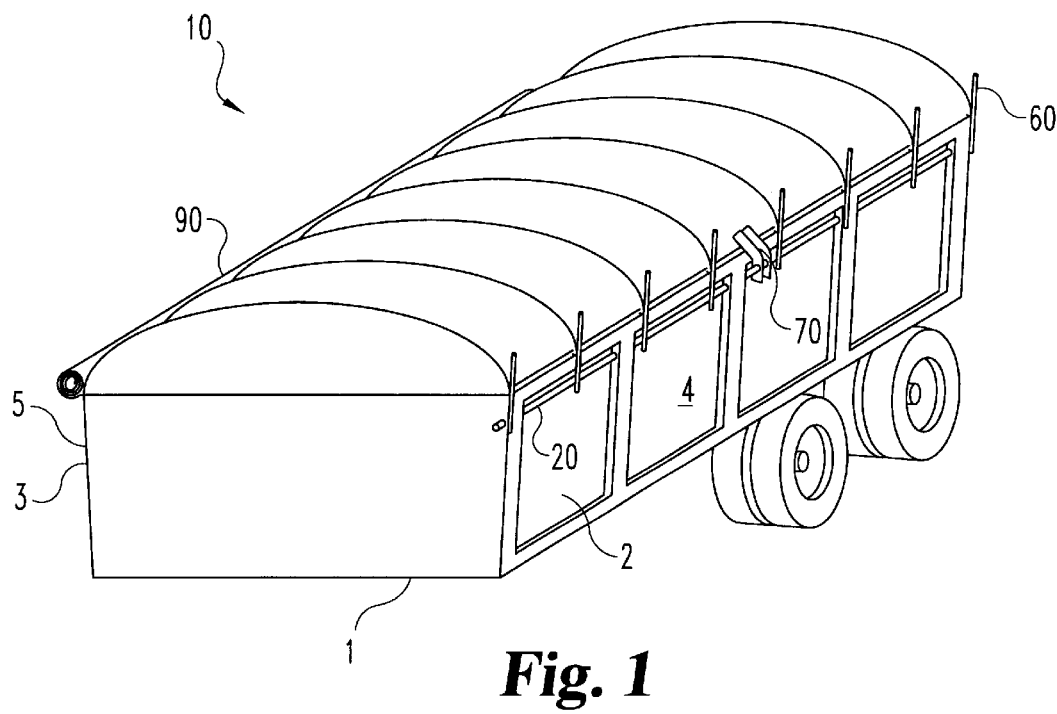
FIG. 1 is a perspective view of a truck bed with tarp retraction apparatus in the covered position.

For promoting an understanding of the invention, specific descriptive language will be used and references will be made to the embodiments illustrated in the drawings. Nevertheless, no limitation of the scope of the invention is intended by the necessary limitations of language and space. Further modifications in the described embodiments and further applications of the principles of the invention as described herein that would normally occur to one skilled in the related art are contemplated as additional obvious embodiments of the present invention.

The present invention is a tarp retraction apparatus designed for open bed trucks. The invention allows an operator to quickly, easily, and safely cover and uncover an open truck bed with a bow-supported tarp. The invention allows an operator, preferably standing on the ground, to roll up the tarp to uncover the truck bed and then raise the tarp bows away from the truck bed in a single motion to provide uninhibited access to the tuck bed. The operator can reverse the operation to lower the trap bows across the truck bed in unison and unroll the tarp to cover the bed.

As indicated above, in one preferred embodiment of the present invention the apparatus comprises a control bar positioned along the upper edge of one side of a truck bed, with a multiplicity of truck tarp bows extending radially from the bar. A lever for rotating the control bar is also attached to the bar. When the control bar is rotated outward, the bows rotate upward and away from the open truck bed providing uninhibited access to the truck bed for loading and unloading. When the control bar is rotated inward, the bows are lowered to extend across the truck bed to support the truck tarp thereon.

In another preferred embodiment the apparatus further comprises a tarp sized to at least span the tarp bows over the truck bed. The tarp has a first edge which is secured on the first truck bed side and a second edge that is parallel to the first edge and is attached to a tarp pole. The tarp may be extended over the tarp bows in a first (extended) position to cover the truck bed or may be rolled on the tarp pole to a second (rolled) position such that the truck bed is uncovered.

Preferably, the apparatus further provides a multiplicity of outside tarp support members affixed to and extending from the center control bar such that when the tarp is in the second (rolled) position, the rolled tarp is supported in the angle between the outside tarp support members and the tarp bow first ends.

In another embodiment of the present invention, the tarp bows are attached to the center control bar through intermediate bow attachment brackets which are affixed to the center control bar. In a preferred embodiment of the invention, the tarp bows are removably attached to the bow attachment brackets for ease of maintenance and replacement.

Various embodiments of the present invention provide for alternative means for securing the first edge of the tarp to the first truck bed side. In one embodiment, the first tarp edge is tethered directed to the truck bed side. In another embodiment, the first tarp edge is affixed to the center control bar. In yet another embodiment it is fixed to a second tarp pole, with said second tarp pole being affixed to the center control bar or to one or more tarp bows, tarp bow attachment brackets or outside tarp support members.

In the most preferred embodiments the outside tarp support members and the tarp bows are positioned relative to one another and to the center control bar so the weight of the tarp in the second rolled position functions as a counterbalance in the rotation of the center control bar, thereby reducing the force required to rotate the center control bar.

Various embodiments of the present invention provide for alternative designs for control arms to rotate the center control bar between the first closed and second open positions. In one preferred embodiment, the control arm further comprises a control arm member affixed to and extending from the center control bar and a removable extension lever attached to the control arm member and extending therefrom to provide additional rotational leverage in rotating the center control bar. In a more preferred embodiment, the removable extension lever extends downward so an operator standing on the ground can rotate the center control bar therewith.

Another alternative embodiment provides for a crank arm removably attached to an end of the center control bar. Yet another embodiment provides for the center control bar to be formed to include a control nut whereby the center control bar may be rotated with a wrench. In yet another embodiment, the center control bar is formed to include sockets whereby an operator may rotate the center control bar with a pike. Another embodiment provides for a downwardly extending control arm operable by an operator standing on the ground which is optionally formed to include a swivel joint, whereby the arm may be rotated to a safe storage position. Yet another alternative embodiment provides for an upwardly extending control arm operable by an operator standing on a step on the truck bed side.

Additional embodiments of the present invention include safety stops such as chains, cords or solid stop members positioned so as to prevent the over-rotation of the center control bar when rotating the control bar from the first closed position to the second open position.

Further features and advantages of the present invention will be readily apparent from the following detailed description of preferred embodiments of the invention with reference to the accompanying figures.

Figure 2:
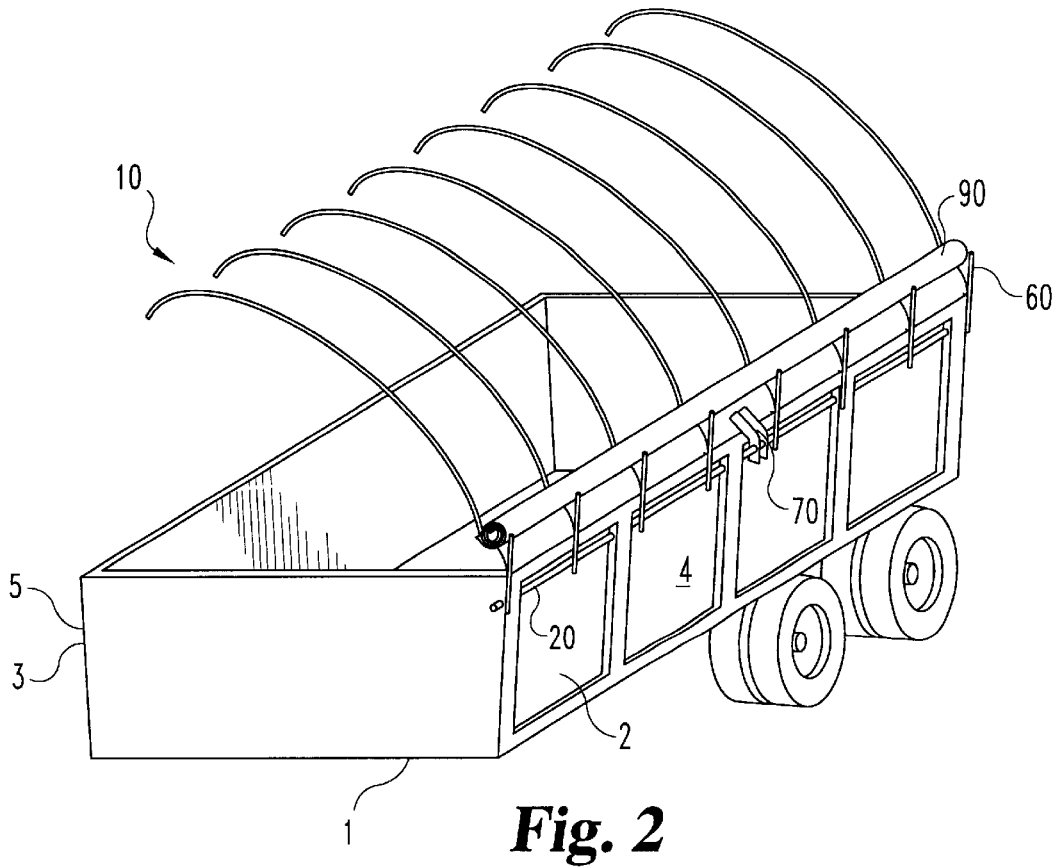
FIG. 2 is a perspective view of truck bed with tarp retraction apparatus in the uncovered position.

Referring now to FIGS. 1 and 2, the tarp retraction apparatus 10 of the present invention provides for a multiplicity of tarp bows 30, each having a first end 32 and a second end 34. Each tarp bow first end 32 is affixed to a center control bar 20. The center control bar 20 is hingedly attached to the outer surface 4 of a first truck bed side 2. The center control bar 20 is oriented roughly parallel to the upper edge 6 of said first truck bed side 2. The center control bar 20 is attached so that it may be rotated between a first closed and a second open position, thereby moving all the tarp bows in unison between a position extending across the truck bed (FIG. 1) and a position extended into the air such that they do not inhibit access to the truck bed (FIG. 2).

Figure 3A:
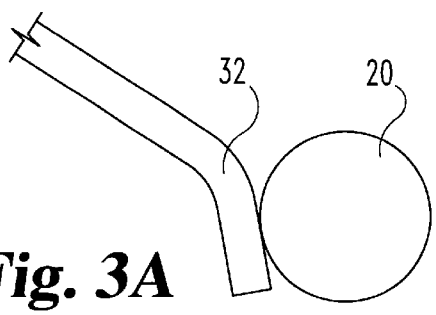
FIGS. 3(a–d) show alternative embodiments of the tarp bow attachment to the control bar.
Figure 3C:
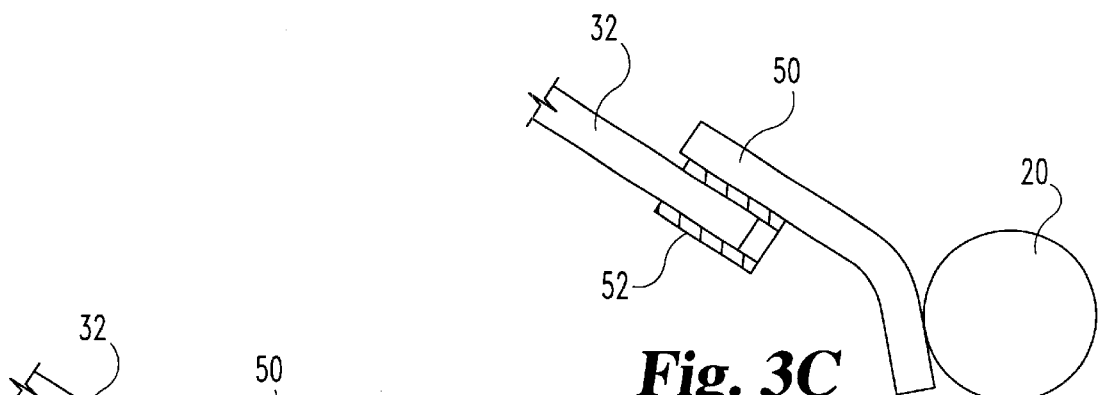
Figure 3B:
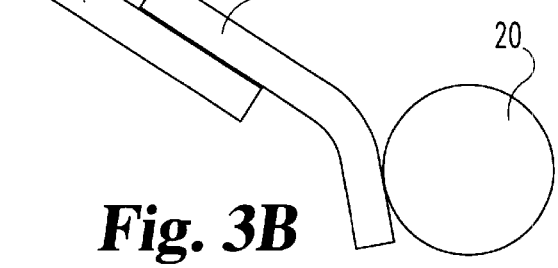
Figure 3D:
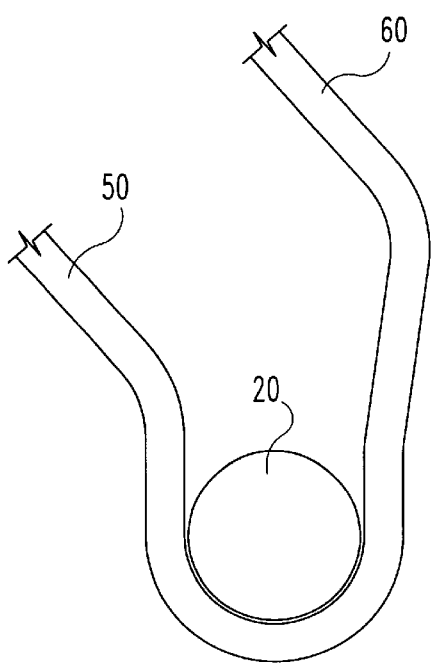

As illustrated in FIG. 3(a), each tarp bow first end 32 may be affixed to the center control bar 20 by directly welding, bolting, screwing or otherwise attaching it to the center control bar 20. In a preferred embodiment, each tarp bow first end 32 is affixed to the center control bar 20 through a tarp bow attachment bracket 50. See FIG. 3(b). The attachment bracket 50 is welded, bolted, screwed, or otherwise attached to the center control bar 20. The tarp bow first end 32 is then welded, bolted, screwed, or otherwise attached to the attachment bracket. In a preferred embodiment, the tarp bow first end 32 is removably attached to the attachment bracket to facilitate repair or replacement of the tarp bow 30. In a more preferred embodiment illustrated in FIG. 3(b), the attachment bracket is formed to include a sleeve 52, sized to receive the tarp bow first end 32. The tarp bow first end 32 may be welded into the sleeve 52 or preferably secured in the sleeve 52 by gravity and friction or with the aid of a set screw, cotter pin, bolt, screw, clamp or other removable fastener.

Each tarp bow second end 34 is formed to include an edge catcher 40 designed to rest on the upper edge 7 of a second truck bed side 3, said upper edge 7 being opposite to and roughly parallel to the first truck bed side upper edge 6. The edge catcher 40 is designed to provide support for the tarp bow second ends 34 on the second upper edge 7 without the need for precise placement of said tarp bow second end 34. Any number of designs for an edge catcher 40 are suitable. FIGS. 4(a–d) illustrates four examples though many others will be immediately obvious to one skilled in the art depending on the exact form of the upper truck bed edge 7 and the angles and curvature of the tarp bow 30. Two alternative positions for the attachment of the tarp bow second end 34 are illustrated in each example in FIG. 4 though the exact position is not important. It is only required that the second tarp bow end 34 be securely supported by the edge catcher 40 on the second truck bed side upper edge 7.

Figure 4A:
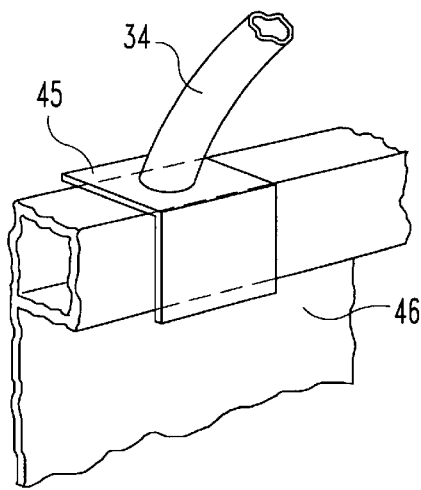
FIGS. 4(a–d) show examples of alternative edge catcher designs.

FIG. 4(a) shows edge catcher 41 formed to include an approximately 90 degree angle and attached to said tarp bow second end 34 at an angle so that as the tarp bow 30 is lowered into the first closed position, the lateral surface 45 contacts the truck bed side upper edge 7 and supports the tarp bow 30 thereon. The vertical surface 46 prevents the lateral over extension of the tarp bow 30 beyond the truck bed side upper edge 9. Thus, edge catcher 41, as for all suitable embodiments of edge catchers 40, provides support for the tarp bow 30 on the truck bed side upper edge 7 and prevents said tarp bow second end 34 from slipping off said truck bed side upper edge 7 under the weight of the tarp 90 and during the normal vibrations of the truck during transit.

Figure 4B:
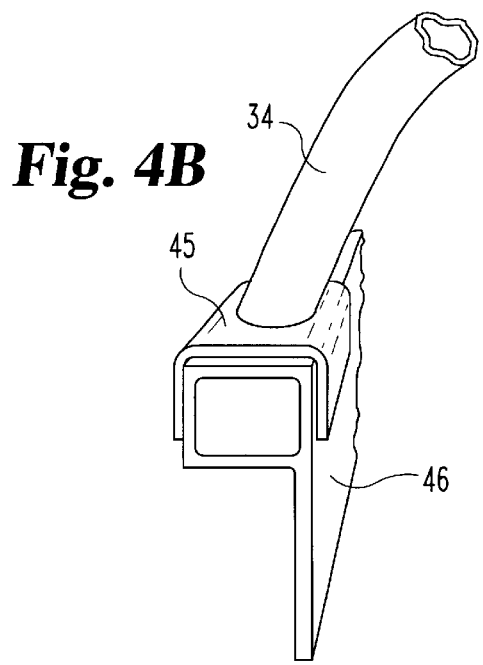

A second suitable design for an edge catcher 42 is illustrated in FIG. 4(b). The U-shaped edge catcher 42 is attached to a tarp bow second end 34 and prevents the lateral over or under extension of the tarp bow second end 34. This provides stable support for the tarp bow second end 34 on the truck bed side upper edge 7 under normal operational conditions without the need for precise placement as the tarp bows 30 are lowered from the second opened position to the first closed position.

Figure 4C:
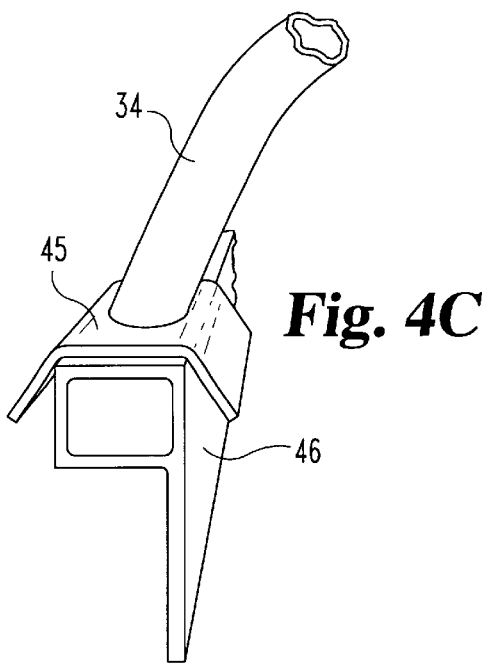
Figure 4D:
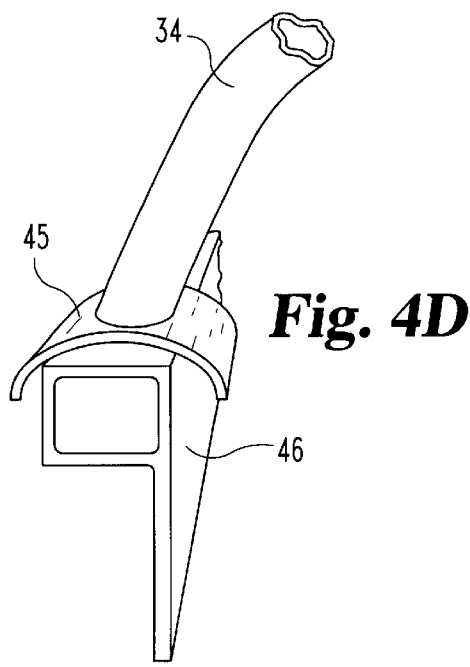

FIGS. 4(c) and (d) illustrate two additional suitable designs for edge catchers 43 and 44 that may be preferred depending on the shape of the truck bed side upper edge 7.

One skilled in the art will also appreciate that edge catchers may be designed at greater cost that would more precisely or securely engage the truck bed side upper edge 7. Designs are possible that would manually or automatically clamp to the edge 7 as the tarp bows 30 are lowered into the first closed position and then release as the tarp bows 30 are retracted to the second open position. These additional embellishments are not, however, necessary to the function of the present invention.

The manner of attachment or the exact position of the center control bar on the truck bed side 2 is not critical. One of ordinary skill in the art may find any number of ways to provide suitable attachment. Suitable attachment will provide stability to the apparatus during operation and while in transit. Suitable attachment and positioning will provide free rotation of the center control bar 20 between the first closed and second open positions without encumbrance of movement of the tarp bows 30, etc. In one preferred embodiment, the center control pipe is mounted to the first truck bed side outer surface 4 near its upper edge 6. Alternative positioning may be found depending on the design of the truck bed, for example, by attachment to the first truck bed side upper edge 6, or to an inner or outer corner thereof.

The center control pipe is hingedly attached to the truck bed side 2 to allow for rotation between a first closed and a second open position. This mounting may be provided by a number of hinge mechanisms common in the art. By way of example, but without limitation, four such hinged mountings are illustrated in FIGS. 5(a–d). Suitable hinges only require sufficient strength to support the described operation and sufficient freedom of rotation to rotate between the first closed and second open positions. The hinges shown in FIGS. 5(a) and (b) are preferred due to their strength, economy, ease of mounting and smoothness of operation. Optionally bearing may be provided in the hinges to facilitate case of rotation.

The present invention also provides for a control arm 70 affixed to the center control bar 20 and extending therefrom for the purpose of providing rotational leverage to turn the center control bar 20 between the first closed and second open positions. Any number of designs for a control arm 70 can be envisioned by one of ordinary skill in the art. The exact configuration used will depend on the truck bed height, length, and width and on the size and weight of the apparatus and tarp. The design of the arm 70 is not critical provided it mechanically provides sufficient leverage for the easy rotation of the center control bar 20 back and forth between the first closed and second open positions by an operator from a safe vantage point. In preferred embodiments, the control arm 70 is designed to allow rotation of the center control bar 20 by an operator standing on the ground.

FIGS. 6(a–g) illustrates seven suitable designs for a control arm 70. These illustrations are not exhaustive and are for example only. It would be obvious to a mechanic or engineer of ordinary skill to make equivalents of the disclosed control arm that allow an operator to easily rotate the center control bar 20 from a safe vantage point as required. FIG. 6(a) shows one preferred embodiment wherein the control arm comprises a control arm member 71 attached to the center control bar 20. The control arm member 71 extends upward and angularly toward the truck bed and is formed to include notches 72 and 73. A removable extension lever 80 having attachment pins 81 and 82 is fitted onto the control arm member 71 so that attachment pins 81 and 82 engage notches 72 and 73. When engaged control lever 80 extends downwardly toward the ground such that an operator standing on the ground may push or pull removable control lever 80 to rotate the center control pipe between the first closed and second open positions, thereby raising or lowering all the tarp bows 30 in unison. The removable extension lever 80 may be easily removed and stored when not in use.

Figure 6A:
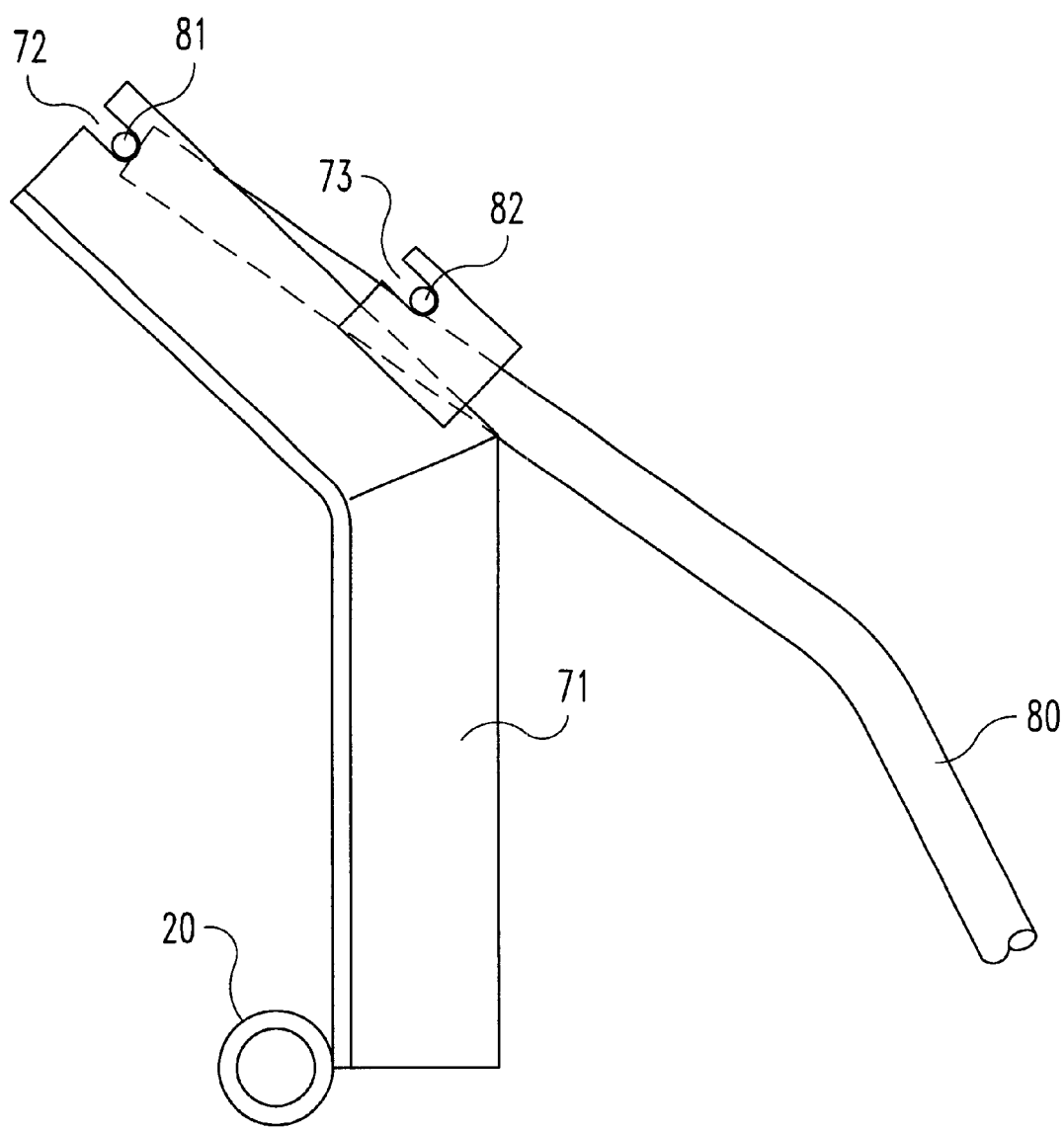
FIGS. 6(a–g) show examples of alternative control lever arm designs.
Figure 6B:
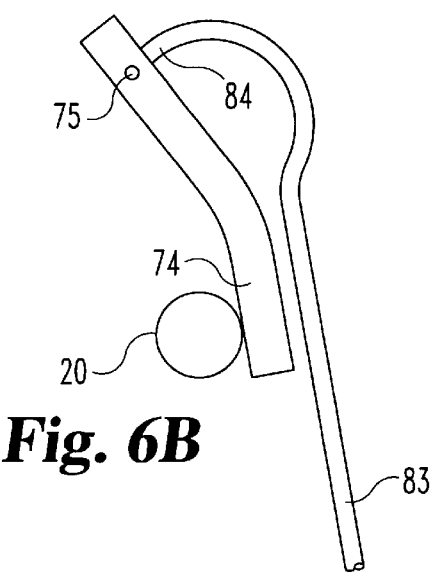

FIG. 6(b) illustrates a suitable alternative design for control arm 70 wherein a control arm member 74 is attached to the center control bar 20 and extends upward and angularly toward the truck bed and is formed to include a hole 75. A removable extension lever 83 is formed to include an end hook 84 designed to engage the control arm member 74 through the hole 75. An operator standing on the ground may pull or push control arm member 74 by use of removable extension lever 83 to rotate the center control bar 20 between the first closed and second open positions.

Figure 6C:
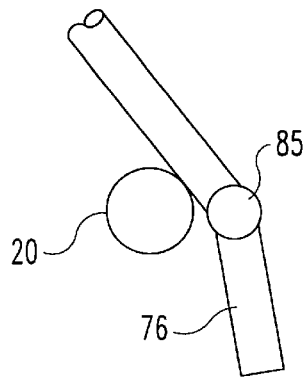

FIG. 6(c) illustrates another suitable design for a control arm member 76 wherein the control arm is attached to the center control bar 20, but extends downwardly to where an operator standing on the ground may push or pull control arm 76 to rotate the center control bar 20. The control arm 76 is formed to include one or more lockable swivel joints 85 whereby the control arm 76 may be positioned and secured in a non-protruding manner when not in use.

Figure 6D:
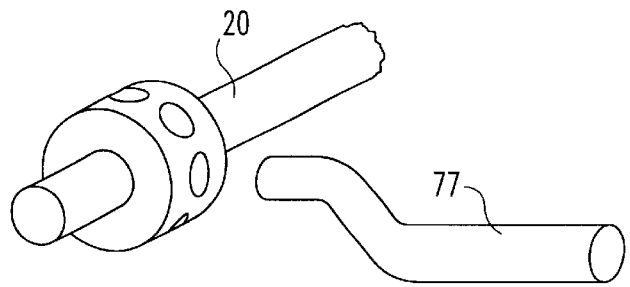

FIG. 6(d) illustrates another suitable embodiment wherein control arm member 77 designed to engage a terminal end 21 of control bar 20 as a crank handle whereby an operator standing on the ground may rotate the center control bar 20.

Figure 6E:
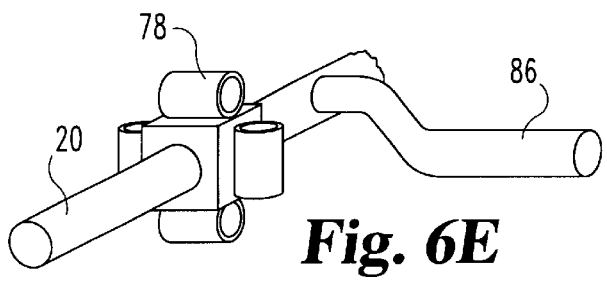
Figure 6F:
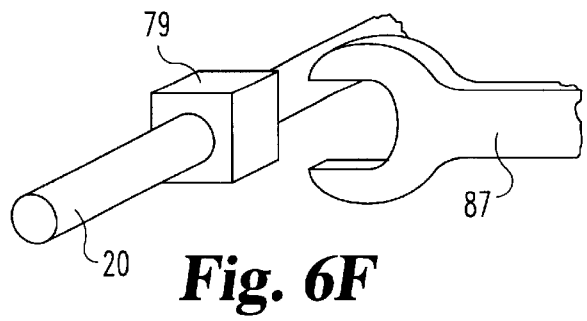
Figure 7:
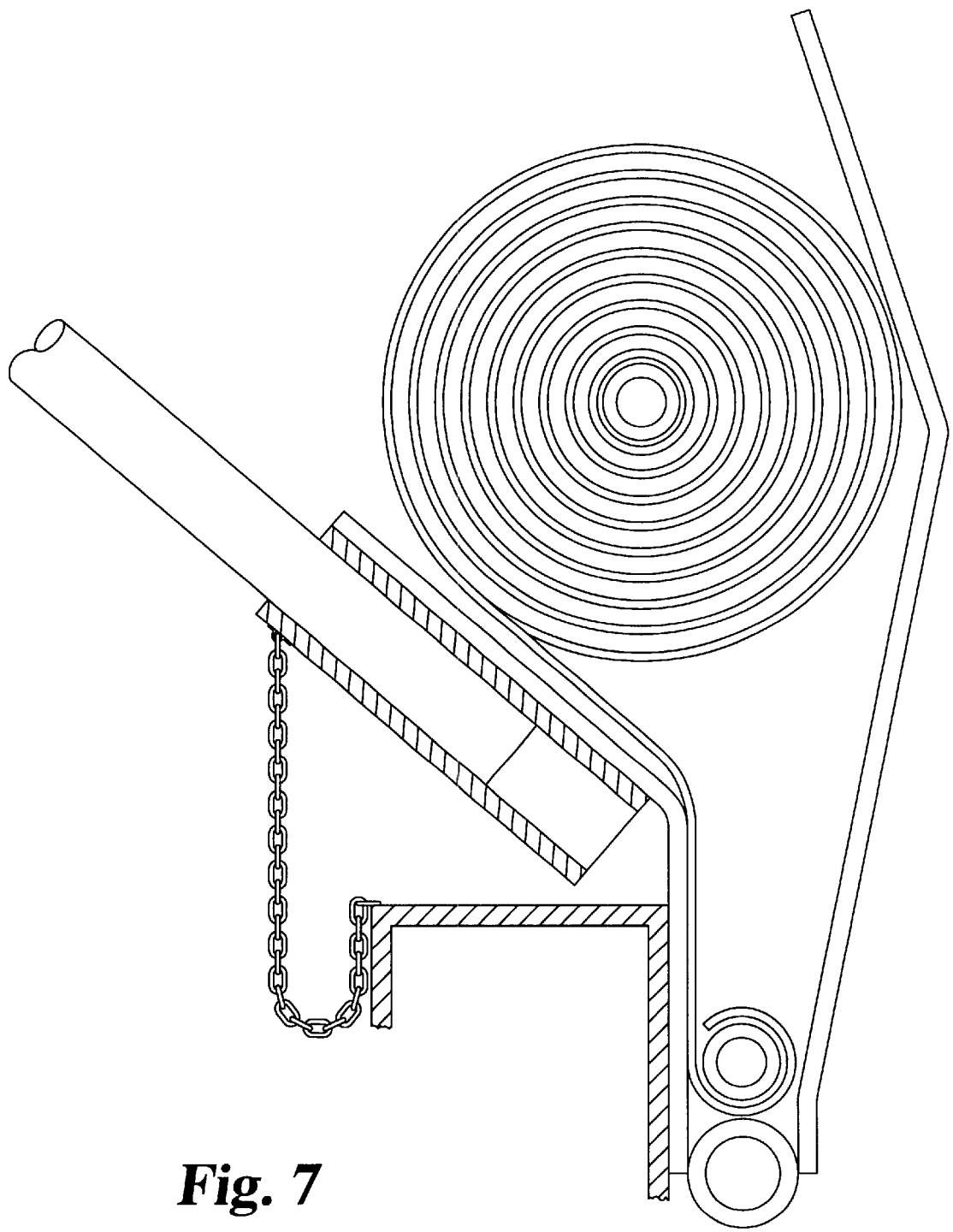
FIG. 7 shows the most preferred embodiment of the tarp retraction apparatus.

FIGS. 6(e) and (f) illustrate two additional suitable control arm designs providing sockets 78 and a control nut 79, respectively, each attached to or formed on central control bar 20, whereby an operator may rotate the center control bar 20 by use of a pike 86 or wrench 87.

FIG. 6(g) shows yet another suitable design for a control arm 89 attached to the center control bar 20 and extending upwardly and angularly toward the truck bed. An operator may stand on a step attached to the first truck bed side outer surface to pull or push the control arm 89 thereby rotating the center control bar 20.

The present invention also provides for a tarp 90 such as is well known in the art. The tarp 90 may be formed of any suitable tarp material and many commercially available tarps may be adapted for use in the present invention. The tarp 90 is sized to at least span the distance across the tarp bows 30 and includes a first edge 92 and second edge 94 which are roughly parallel one to another. The first edge 92 is attached to a first tarp pole 96 while the second edge 94 is attached to a second tarp pole 98. The first tarp pole 96 is immobilized on the first truck bed side outer surface 4 so as to secure said first tarp edge to the truck bed during operation of the apparatus and while in transit. The tarp edges 92, 94 are affixed to the tarp poles 96, 98 by any means known in the art, as for example, but without limitation, by tie-downs, lashings, or by a sleeve in the tarp edges 92, 94 with the tarp poles 96, 98 passing through said sleeve.

The tarp 90 may be in a first extended position, drawn over the tarp bows 30 covering the truck bed, or it may be rolled up on the second tarp pole 98, from the second edge 94 to the anchored first edge 92, thereby uncovering the truck bed.

There is also provided in the present invention a multiplicity of tarp support members 60 attached to and extending upwardly from the center control bar 20. The tarp support members 60 are positioned relative to the tarp bows 30, such that the rolled tarp rests in the angle between the tarp support members 60 and the tarp bows first ends 32, thereby preventing the rolled tarp 90 from falling off the truck. In a preferred embodiment, the relative angling of the outside tarp support members 60 and the tarp bow first ends 32 and the center control bar 20 are such that the weight of the rolled tarp 90 acts as a counter-balance facilitating the rotation of the center control bar 20 between the first closed position and second open positions. In one preferred embodiment, the outside tarp support members 60 and the tarp bow attachment brackets 50 or tarp bows 30 are formed from a single piece of material and welded, bolted, screwed, clamped or otherwise attached to the center control bar 20.

The manner in which the first tarp pole 96 is immobilized on the first truck bed side outer surface 4 is not critical. Any manner of securing is suitable providing it does not inhibit operation of the apparatus and provided the first tarp edge 92 does not move while the tarp is being rolled or extended, or during the operation of the apparatus, or when the truck is in transit. In one embodiment, the center control bar 20 also functions as the first tarp pole 96. In another embodiment, the first tarp pole 96 is attached to the center control bar 20, or to the first truck side outer surface 4, or to at least one outer tarp support member 60, tarp bow first end 32, or tarp attachment bracket 50. It is understood that an equivalent embodiment is to secure the first tarp edge 90 directly to the first truck bed side 2 by any manner known in the art, either with or without a first tarp pole 96 as an intermediary or adjunct.

The present invention also provides for safety stops to prevent the over-rotation of the center control arm. The form of safety stop is not critical and it will be readily apparent to one skilled in the art how to fashion suitable stops. In one preferred embodiment, at least one chain or cord 100 is positioned with one end affixed to the first truck bed side 2 and the other affixed to a tarp bow first end 32 or tarp bow attachment bracket 50. The chain or cord 100 is of a length to be lax when the center control bar 20 is in the first closed position, but fully extended when the center control bar 20 is in the second open position, thereby preventing further rotation of the center control bar 20.

Another embodiment for a suitable safety stop in the present invention comprises a solid stop member 102 positioned on the first truck bed side 2 so as to engage the control arm 70 or outer tarp support member 60 when the center control bar 20 is rotated to the second open position, thereby inhibiting further rotation of the center control bar 20. A combination of safety stop chains or cords and safety stop members can be used together.

In operation of the present invention, an open bed truck is loaded when the control bar 20 is in the second open position and the tarp bows 30 are extending upwardly in the air so as not to inhibit access to the truck bed. When the truck has been loaded, the operator standing on the ground or in an alternative safe vantage point, operates the control arm 70, optionally assisted by the counter-balance weight of the rolled tarp 90, to rotate the center control bar 20 from the second open position to the first closed position, thereby lowering the tarp bows 30. As the tarp bows 30 lower and the center control bar 20 moves into the first closed position, the edge catchers 40 make contact with the upper edge 7 of the opposite second truck bed side 3, thereby supporting the tarp bow second ends 34 on said second truck bed side 3. The operator then unrolls the tarp 90 to the first extended position and secures the second tarp edge 94 for transit.

In preparation for unloading the truck, an operator first rolls up the tarp 90 on the second tarp pole 98 until the tarp is in the second rolled position. The operator positioned on the ground or at another safe vantage point, operates the control arm 70, to rotate the center control bar 20 to the second open position thereby simultaneously raising all tarp bows 30 to an upwardly extending position to again provide uninhibited access to the truck bed for unloading.

While the invention has been illustrated and described in detail in the drawings and foregoing description, this is to be considered illustrative and not restrictive. It is to be understood that only the preferred embodiments have been shown and described. All modifications and equivalents of the elements of the disclosed invention that come within the spirit of the invention as defined by the following claims are contemplated and their protection is desired.

What is claimed is:

1. A tarp retraction apparatus on an open bed truck, said truck having a bed floor, a first side wall, and a second side wall, each side wall having an upper edge portion, said upper edges being roughly parallel to one another, said apparatus comprising;

(a) a control bar extending along the outer edge portion of said first side wall, said control bar being rotatable along its axis between a first closed position and a second open position; and (b) a multiplicity of tarp bows, each having a first end and a second end, said tarp bows being affixed at said first end to said control bar, the bows being positioned and shaped so that when the control bar is in the first closed position, the bows arc across the truck bed and extend to the upper edge of said second side wall, and when the control bar is rotated to its second open position the tarp bows are moved upwardly and outwardly so as to not inhibit access to the truck bed.

2. The apparatus of claim 1 and further including a control arm affixed to the control bar so as to provide rotational leverage for moving the control bar between the first closed and second open positions.

3. The apparatus of claim 1 and further including a multiplicity of outside tarp support members affixed to and extending upwardly from the center control bar.

4. The apparatus of claim 3 and further including a tarp sized to at least span the tarp bows.

5. The apparatus of claim 4 wherein said tarp support members are positioned relative to the tarp bows such that when the tarp is in a rolled position, the rolled tarp is supported between said outside tarp support members and said tarp bows.

6. A tarp retraction apparatus on an open bed truck, said truck having a bed floor and at least a first and a second bed side extending upwardly from said bed floor, each side having an outer surface and an upper edge, said upper edges being roughly parallel to one another, said apparatus comprising;

(a) a control bar extending along the outer surface of said first bed side, being roughly parallel to the upper edge of said first bed side, said control bar being rotatable between a first closed position and a second open position;

(b) a multiplicity of tarp bows, each having a first and second end, said tarp bows being affixed through said first end to said control bar and each second end being formed to include an edge catcher, the bows being positioned and shaped so that when the control bar is in the first closed position, the bows arc across the truck bed and the edge catchers rest on the upper edge of said second bed side, supporting the second bow ends thereon, and when the control bar is rotated to the second open position, the tarp bows are retracted upwardly and outwardly so as to not inhibit access to the truck bed;

(c) a control arm affixed to the control bar so as to provide rotational leverage for moving the control bar between the first closed and second open positions;

(d) a multiplicity of outside tarp support members affixed to and extending upwardly from the center control bar; and (e) a tarp sized to at least span the tarp bows, said tarp having first and second edges roughly parallel to one another, said first edge being affixed to a first tarp pole, said first tarp pole being immobilized on said first truck bed side, and said second edge being affixed to a second tarp pole such that the tarp may be extended over the tarp bows in a first extended position to cover the truck bed, or rolled up on said second tarp pole to a second rolled position such that the truck bed is uncovered;

wherein the tarp support members are positioned relative to the tarp bows such that when the tarp is in said second rolled position, the rolled tarp is supported in the angle between said outside tarp support members and said tarp bows.

7. The apparatus of claim 6 wherein the tarp bows are affixed to the control bar through tarp bow attachment brackets, said brackets being directly affixed to the center control bar.

8. The apparatus of claim 7 wherein the tarp bows are removably fixed in the tarp bow attachment brackets.

9. The apparatus of claim 7 wherein the tarp bow attachment brackets are formed to include a sleeve, sized to receive the tarp bow first ends.

10. The apparatus of claim 9 wherein the tarp bow first ends are removably screwed in the sleeves.

11. The apparatus of claim 6 wherein the first tarp pole is also the control bar.

12. The apparatus of claim 6 wherein the first tarp pole is affixed to the control bar, or to one or more outside tarp support members or tarp bow first ends.

13. The apparatus of claim 7 wherein the first tarp pole is affixed to one or more tarp bow attachment brackets.

14. The apparatus of claim 6 wherein the tarp, when in the second rolled position, supported in the angle between the outside tarp support members and the tarp bows, functions as a counterbalance in the rotation of the center control bar, reducing the force required to rotate the center control bar.

15. The apparatus of claim 6 wherein the control arm comprises a control arm member affixed to and extending from the center control bar and an extension lever removably engageable with the control arm member and extending therefrom to provide additional rotational leverage for rotating the center control bar between the first closed and second open positions.

16. The apparatus of claim 15 wherein the removable extension lever extends downwardly such that an operator can operate the lever from the ground.

17. The apparatus of claim 6 and further comprising at least one safety stop chain or chord having a first end affixed to said first truck bed side and a second end affixed to a tarp bow or tarp bow attachment bracket and being of a predetermined length such that the chain or chord is lax when the center control bar is in the first closed position, but fully extended when the center control bar is in the second open position, thereby preventing over-rotation of the center control bar.

18. The apparatus of claim 6 and further comprising at least one safety stop member positioned to inhibit over-rotation of the center control bar.

* * * * *